United States Patent
Rampal

[11] Patent Number: 6,152,696
[45] Date of Patent: *Nov. 28, 2000

[54] SWASH-PLATE DEVICE FOR CONTROLLING THE PITCH OF ROTOR BLADES WITH NON-ROTATING PLATE ARTICULATED ON A CENTRAL BALL JOINT

[75] Inventor: Etienne Rampal, Marseilles, France

[73] Assignee: Eurocopter, France

[*] Notice: This patent is subject to a terminal disclaimer.

[21] Appl. No.: 09/187,078

[22] Filed: Nov. 6, 1998

[30] Foreign Application Priority Data

Nov. 13, 1997 [FR] France .................................. 97 14232

[51] Int. Cl.$^7$ ................................................. B64C 27/605

[52] U.S. Cl. ...................... 416/114; 416/134 A; 416/141; 416/170 R

[58] Field of Search .................................... 416/114, 115, 416/134 A, 141, 170 R

[56] References Cited

U.S. PATENT DOCUMENTS

| 3,486,832 | 12/1969 | Stone et al. | 416/114 |
|---|---|---|---|
| 3,734,644 | 5/1973 | Garcia | 416/114 |
| 4,375,940 | 3/1983 | Lovera et al. | 416/114 |
| 4,630,998 | 12/1986 | Leman et al. | 416/114 |
| 5,199,849 | 4/1993 | Leman | 416/114 |
| 6,033,182 | 3/2000 | Rampal | 416/114 |

*Primary Examiner*—F. Daniel Lopez
*Assistant Examiner*—Richard Woo
*Attorney, Agent, or Firm*—Piper Marbury Rudnick & Wolfe

[57] ABSTRACT

The swash-plates are oscillating mounted by the non-rotating plate on a central ball joint sliding axially around a guide fixed to the structure and on which the ball joint is locked from rotation by internal splines engaging with external splines of the guide. Two parts slide on diametrically opposite raised sectors on the ball joint, and the non-rotating plate pivots on trunnions of the parts around one of two perpendicular axes the other of which is the one around which the parts pivot and which is perpendicular to the rotor axis.

15 Claims, 5 Drawing Sheets

SWASH-PLATE DEVICE FOR CONTROLLING THE PITCH OF ROTOR BLADES WITH NON-ROTATING PLATE ARTICULATED ON A CENTRAL BALL JOINT

FIELD OF THE INVENTION

The invention concerns devices for controlling the pitch of aircraft rotor blades, and in particular, devices for controlling the pitch of a helicopter main rotor.

BACKGROUND OF THE PRIOR ART

The invention concerns devices for controlling the pitch of rotor aircraft rotor blades, particularly for a helicopter main rotor, the rotor being of the type for which each blade is, on the one hand, rotated around an axis of rotation of a rotor shaft, or rotor axis, by means of a hub rotating integrally with the shaft, and, on the other hand, rotating integrally, around a longitudinal blade pitch change axis, with at least one pitch lever controlled by a corresponding pitch rod.

The invention relates more exactly to a pitch control device of the type including a swash-plate assembly, and such that each pitch rod is connected to a plate rotating with the rotor and belonging to the swash-plate assembly, in which the rotating plate is rotary mounted on a non-rotating plate, restrained against any rotation around the rotor axis, the two plates being annular, surrounding the rotor axis and being oscillating mounted by the non-rotating plate on a central ball joint, centered on the rotor axis and mounted sliding parallel to the rotor axis around a cylindrical guide coaxial to the rotor axis and non-rotating around said rotor axis, with the result that the swash-plates can be translated axially, i.e. parallel to the rotor axis, and tilted in any direction around the rotor axis, being activated by control actuators connecting the non-rotating plate to the structure of the rotor aircraft, for the control respectively of the collective pitch and the cyclic pitch of the blades.

Generally, the two plates surround the rotor shaft and the control actuators are three servo controlled jacks or similar actuators placed between the swash-plates and the rotor aircraft structure, and articulated by ball joints at their lower and upper ends respectively on this structure and in devises of the non-rotating plate, whereas the pitch rods extend between the swash plates and the pitch levers of the rotor blades, and are articulated by ball joints at their upper and lower ends respectively on the pitch levers and in devises distributed at the periphery of the rotating plate.

Most often, the cylindrical guide is fixed in relation to the rotor aircraft structure and where the swash-plates surround the rotor shaft, the cylindrical guide is tubular, surrounds the rotor shaft, and is fixed to a housing integral with the structure of the rotor aircraft and surrounding the connection between the rotor shaft base and the main gear box.

Most often also, the rotating and upper or non-rotating and lower connection part or parts which connect respectively the rotor to the rotating plate to rotate this latter, and the structure to the non-rotating plate, to restrain the latter, is or are one or more torque links with two scissor-articulated arms and connected to each other by a pivot or a hinge, which enables the two arms of each torque link to move apart or draw together in order to enable movements in the direction of the rotor axis, since the upper and lower arms of a rotating torque link are moreover articulated on the shaft or the hub of the rotor and on the rotating plate respectively, and as the lower and upper arms of a non-rotating torque link are moreover articulated on the structure of the rotor aircraft and on the non-rotating plate.

The drawbacks of these rotating and non-rotating torque links are that their articulations comprise traditional, unreliable, bearings, or, on more recent helicopters, self-lubricating ball joints and bearings including numerous carbide pins and rings, which are heavy and expensive.

Furthermore, a certain overall height or axial requirement (parallel to the rotor axis) and width requirement is necessary for the torque links to operate correctly. So, to facilitate their loading for example in the hold of a transport airplane and to improve their capacity to be accommodated in a hangar, for example of a ship, modern helicopters must offer the best possible vertical or axial compactness of the shaft and the main rotor assembly and of the swash-plate assembly which surrounds it. But reduction in the height or axial size of such an assembly is limited by the interference between the two arms of a torque link during folding of the latter and by the maximum swiveling angles permitted by the construction of the articulation ball joints of the torque links.

SUMMARY OF THE INVENTION

The problem at the basis of the invention is to propose a pitch control swash-plate device of the aforementioned type, with central ball joint sliding around a guide, and which comprises no non-rotating torque link for locking the non-rotating plate against rotation, but which comprises instead means enabling the axial space requirement and, preferably also the transverse space requirement, of the pitch control device, and therefore of the mast-hub assembly of a main rotor to be reduced.

A further object of the invention is to propose a pitch control device in which the non-rotating torque link or links of conventional devices is or are replaced by non-rotating plate restrainers which are better suited to the various demands of practice, and which in particular comprise parts which are less numerous, less heavy, less expensive to manufacture, assemble and to maintain, and which generate less aerodynamic drag than non-rotating torque links.

To this end, the pitch control device of the invention, of the type presented above, is characterized in that the ball joint is immobilized from rotating around said rotor axis on said guide, and the non-rotating plate is mounted pivoting, around a first diametrical axis of the ball joint, on two parts diametrically opposite in relation to the center of the ball joint and simultaneously locked against rotation, around the rotor axis, on the ball joint and guided in pivoting around a second diametrical axis of the ball joint, which is perpendicular to said first diametrical axis and to the rotor axis, by guide means on the ball joint, said guide means guiding each of said parts on one of two trajectories respectively in diametrically opposite circular arcs in relation to the center of the ball joint and concentric around said second diametrical axis.

Thus, the non-rotating plate can tilt in any direction around the rotor axis by an articulation similar to a cardan, by pivoting on the guided parts around the first diametrical axis and moving with the guided parts by pivoting on the ball joint around the second diametrical axis.

In the device of the invention, the non-rotating torque link is replaced by means providing rotation immobilization of the ball joint on the guide, and the rotation lock of the non-rotating plate on the ball joint provided by the guided parts locked against rotation on the ball joint. Simultaneously, the number of parts in the device is reduced, as is their mass, the result of which is to simplify the assembly and maintenance, and therefore to reduce the costs of production, assembly and maintenance, compared with a version with non-rotating torque link.

In accordance with an advantageously straightforward embodiment, the ball joint is immobilized from rotating on the guide by ball joint internal splines, which extend parallel to the rotor axis and are engaged in external axial splines of said guide, which is preferably fixed to the structure of the rotor aircraft.

In an embodiment which has an advantage in respect of the reduced number and mass of the parts, each guided part includes a trunnion engaged to pivot in one of two bores respectively of the non-rotating plate, which bores emerge in an internal radial face of said non-rotating plate, and are diametrically opposite in relation to the center of the non-rotating plate and coaxial around a diametrical axis of said non-rotating plate which is merged with said first diametrical axis of the ball joint, so as to enable the non-rotating plate to pivot on the trunnions of the guided parts.

In a straightforward and robust embodiment, comprising few parts, the guide means include two raised sectors, diametrically opposite in relation to the center of the ball joint, and each projecting radially outwards, in relation to the rotor axis, on the bottom of one of two hollows respectively arranged in the ball joint on either side of the rotor axis and of said second diametrical axis of the ball joint, so that each of the two sectors delimits on its external face a circular arc guide track around said second diametrical axis. In this case, each guided part includes, in order to engage to advantage with the guide sectors, a clevis overlapping one of the sectors respectively, and sliding by the clevis bottom against the guide track on the external face of said sector, while one at least of the two flanges of the clevis provides restraint for said clevis against rotation around the rotor axis, on said sector by contact with one at least of the side faces of said sector.

In order to simplify the manufacture and improve the dynamic balance of the device, the two sectors are cylindrical sectors with the same constant transverse dimension and with axis merged with said second diametrical axis.

In this case, the bottom of each clevis is also a cylindrical surface portion of corresponding radius.

As regards the rotating plate, it may be rotated with the rotor with the help of at least one rotating torque link, including at least two branches, articulated one on the other and one on the rotating plate, whereas the other branch is articulated on the shaft-hub assembly of the rotor.

But it is to advantage, in order also to eliminate the rotating torque link and improve further the axial space requirement of the device and of the rotor head, that the rotating plate is rotated with the rotor with the help of a driver as described in French patent application 97 12126, i.e. a driver including two rigid rotation drive tracks extending at least partly substantially axially, parallel to the rotor axis, diametrically opposite in relation to said rotor axis and rotating integrally with one at least of the two parts namely the hub and the rotor shaft, each track engaging with respectively one of two drive pins, rotating integrally with the rotating plate and diametrically opposite on this latter, one of the two engaging elements namely a track and a pin having two flanges between which the other element is engaged, so that each drive pin follows on the corresponding track a rectilinear trajectory, parallel to the rotor axis, in the case of variation in collective pitch, and a circular arc trajectory centered on the rotor axis in the case of variation in cyclic pitch.

As described in the aforementioned application, each drive track is delimited to advantage in a substantially axial groove of the driver, and the corresponding pin is engaged in the groove.

In order to have good flexural and torsional rigidity and good resistance to fatigue, each groove may be formed in a substantially axial part having a "U" shaped transverse section of one of two rigid drive arms respectively, and the corresponding pin is engaged between the two flanges of the "U" shaped groove of said arm, and to limit the transverse space requirement and the drag of the device, the "U" shaped groove is open radially towards the rotor axis, and each pin projects outwards from the rotating plate, radially in relation to the center of said rotating plate.

To take account of the fact that rotating drive stresses may be unbalanced and alternate on the two flanges of the "U" shaped groove of the arm, in particular during variations in collective and cyclic pitch, one at least of the pins includes to advantage at least one pad and/or at least one roller sliding and/or rolling respectively against one at least of the two flanges of the "U" shaped groove delimiting the corresponding drive track.

When said pin includes a pad, the pad is to advantage articulated in relation to the rotating plate, at least in rotation around an axis passing through the center of the rotating plate, on the rotor axis, and, in a preferred embodiment, the pad has two opposite side faces approximately plane and parallel to the flanges of the "U" shaped groove in which the pad slides, and the pad is rotary and sliding mounted around a pad support hub which is fixed on the external radial end of a pin-support arm of the rotating plate.

As a variant, the pins may each comprise one of two coaxial rollers respectively, mounted diametrically opposite on the rotating plate and rolling around their common axis.

BRIEF DESCRIPTION OF THE DRAWINGS

Other characteristics and advantages of the invention will emerge from the description given below, in a non-restrictive way, of some embodiments described by reference to the appended drawings in which:

FIG. 5a is a larger scale view of a detail of FIG. 5, showing a drive pin with a ball jointed roller.

DETAILED DESCRIPTION OF THE INVENTION

Figure 1:
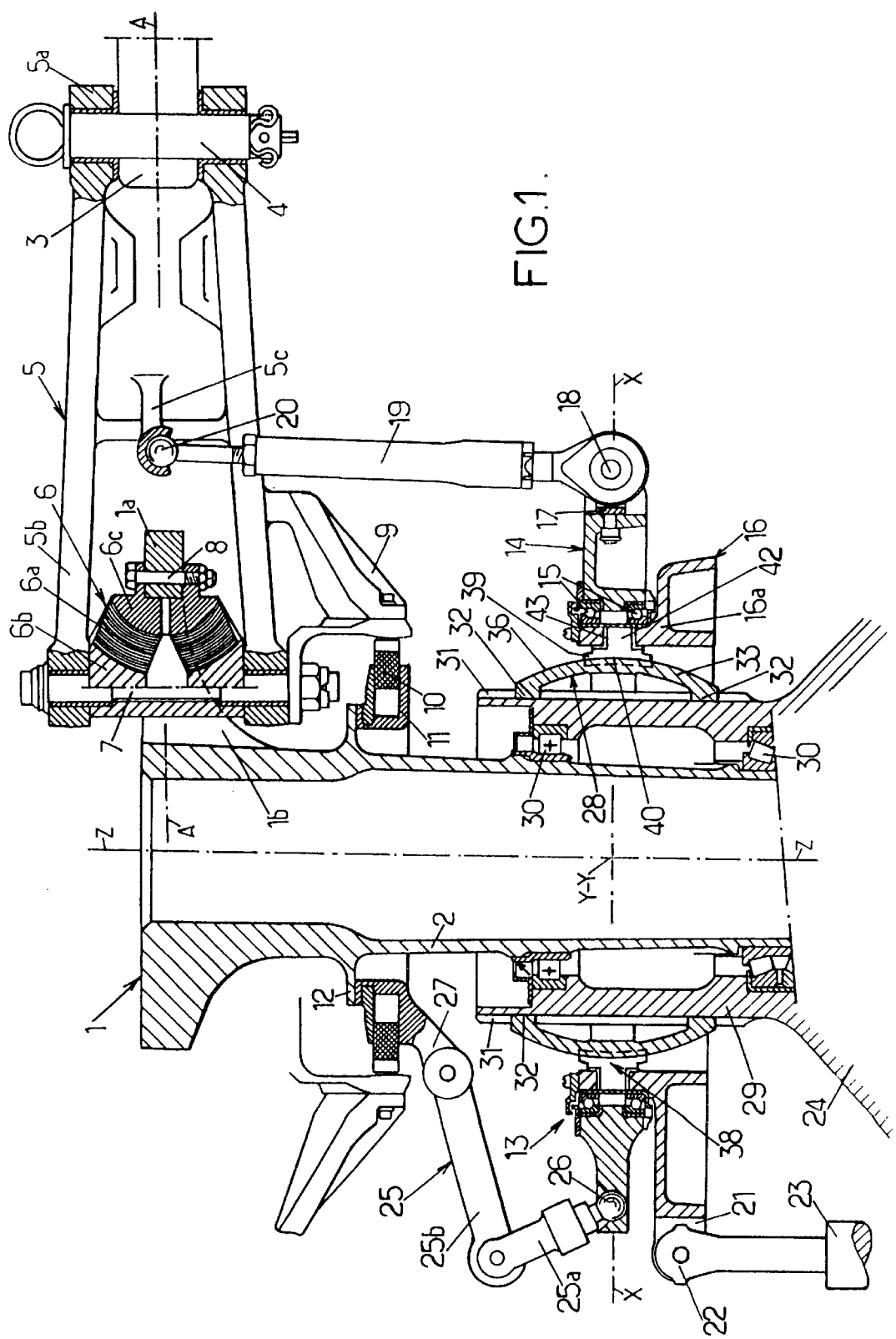
FIG. 1 is a diagrammatic and partial sectional view passing through the rotation axis of a helicopter main rotor equipped with an example of a pitch control device in accordance with the invention.

In FIG. 1, the helicopter main rotor shown has a known structure: it includes essentially a hub 1 integral with the upper end of a tubular rotor shaft 2, rotated by its base around its axis Z—Z, which is the axis of rotation of the rotor. Each rotor blade 3 (only one of which is partly shown in FIG. 1) is restrained by its root, and with the help of two transverse pins such as 4, in an external radial clevis 5*a* of a part 5 connecting the blade 3 to the hub 1. The part 5, henceforward called a sleeve in the rest of the description, has an internal radial clevis 5*b* by which the sleeve 5 is connected to the hub 1 by restraining and articulation means 6, which restrain the sleeve 5 and the blade 3 against centrifugal forces, when the rotor rotates, and enable angular clearances of the sleeve 5 and of the blade 3 in pitch, around a longitudinal pitch change axis A—A, approximately radial in relation to the rotor axis Z—Z, and in flapping and in drag, in the known way.

In this example, the restraining and articulation means 6 include a spherical laminated bearing of known structure, with a laminated central part 6*a*, constituted by an alternate stacking of rigid cups and layers of elastomer in the shape of spherical caps centered approximately in the external radial edge 1*a* of a corresponding recess 1*b* of the hub 1, which is of the type with a dimpled radial plate, comprising as many axial recesses 1*b* as the rotor comprises blades 3. On either side of its central part 6*a*, the spherical laminated bearing 6, housed in the corresponding recess 1*b*, includes an internal radial frame 6*b*, mounted as a spacer between the branches of the internal clevis 5*b* of the sleeve 5 by threaded pins such as 7, and an external radial frame 6*c* fixed by screw-nut assemblies such as 8 on the external radial edge 1*a* of the corresponding recess 1*b*. The spherical laminated bearing 6 is thus connected to the hub 1 by its external frame 6*c* and to the sleeve 5 by its internal frame 6*b*.

For each blade 3, a low anti-flap restrainer 9, fixed under the internal clevis 5*b* of the sleeve 5, works together with a droop restraining ring 10, of known structure, mounted sliding radially around the shaft 2 in a guide ring 11 fixed, for example by bolting, to an external radial flange ring 12 of the shaft 2.

The shaft 2 is surrounded by a swash-plate assembly 13 of a blade pitch control device, the sleeve 5 of each blade 3 being equipped, to this end, with a pitch lever 5*c* projecting laterally from the sleeve 5, for example towards the leading edge of the corresponding blade 3.

The swash-plate assembly 13 includes two annular plates, surrounding the rotor shaft 2, and one of which is a rotating plate 14 rotary mounted with the help of two ball bearings 15 around the central part 16*a* of the other plate 16 which is a non-rotating plate. External radial devises 17, equal in number to the blades 3, are evenly distributed over the external periphery of the rotating plate 14, and in each clevis 17 is restrained a ball joint 18 articulating, on the rotating plate 14, the lower end of a pitch control rod 19, the upper end of which is articulated, also by a ball joint 20, in an end clevis of the pitch lever 5*c* of a corresponding blade 3. Under the rotating plate 14, the non-rotating plate 16 has three external radial devises such as 21, one of which is for example directed towards the back of the helicopter and each of the two others laterally towards one of the two sides respectively of the helicopter, and in each of which is restrained a ball joint 22 articulating, on the non-rotating plate 16, the upper end of one of three control actuators 23, for example double acting linear servo controlled jacks, respectively, the lower end of each of which is articulated, also by a ball joint (not shown) in a clevis of the structure of the helicopter, for example on the conical housing 24, which is fixed to the structure of the helicopter and surrounds the connection of the base of the rotor shaft 2 to the output of the main transmission box, for rotating the shaft 2.

On its periphery and between the devises 17, the rotating plate 14 is also articulated on two rotating parts 25 (only one of which is shown), connecting the rotating plate 14 to the shaft 2 of the rotor to drive the rotation of the plate 14 around the axis Z—Z. This rotating part may be a rotating torque link 25 of conventional structure, with two arms 25*a* and 25*b* articulated by pivoting one on the other, and one 25*a* by a ball joint 26 on the rotating plate 14, and the other 25*b* by pivoting in a clevis 27 of a torque link driver constituted, in this example, by the ring 11 fixed to the flange 12 of the shaft 2.

The two coaxial plates 14 and 16 may be translated axially, parallel to the rotor axis Z—Z, and tilted in any direction around this axis Z—Z by an axial translation and tilting guidance mechanism, which keeps the plates 14 and 16 centered on the rotor axis Z—Z. This guidance mechanism includes a central ball joint 28, on which the non-rotating plate 16 is oscillating mounted by its central part 16*a*, the ball joint 28 being centered on the rotor axis Z—Z and mounted sliding axially (parallel to the axis Z—Z) around a tubular cylindrical guide 29, coaxial to the rotor axis Z—Z and non-rotating around this axis, being integral with the conical housing 24. In this axial guide 29, fixed in relation to the structure of the helicopter, the shaft 2 is guided in rotation by two bearings 30.

Rotational lock of the non-rotating plate 16 around the axis Z—Z is provided by rotational lock of the ball joint 28 around the guide 29 and by rotation lock of the non-rotating plate 16 on the ball joint 28.

Rotational lock of the ball joint 28 on the guide 29 is provided by axial splines 31 (parallel to the axis Z—Z) on the external radial face of the cylindrical guide 29 and engaging with internal axial splines 32 of the upper and lower tubular end parts of the ball joint 28.

Figure 2:
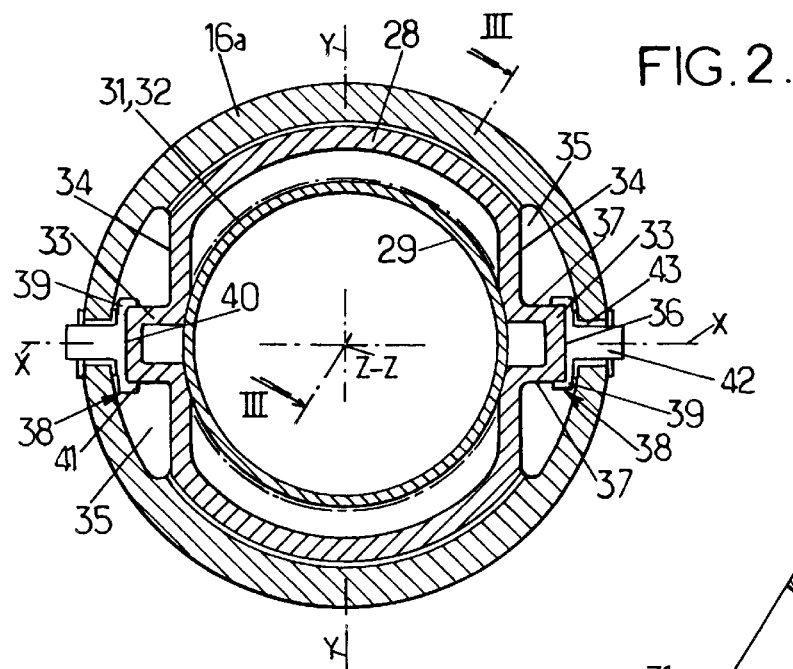
FIG. 2 is a partial sectional view, perpendicular to the axis of rotation, of the device of FIG. 1.
Figure 3:
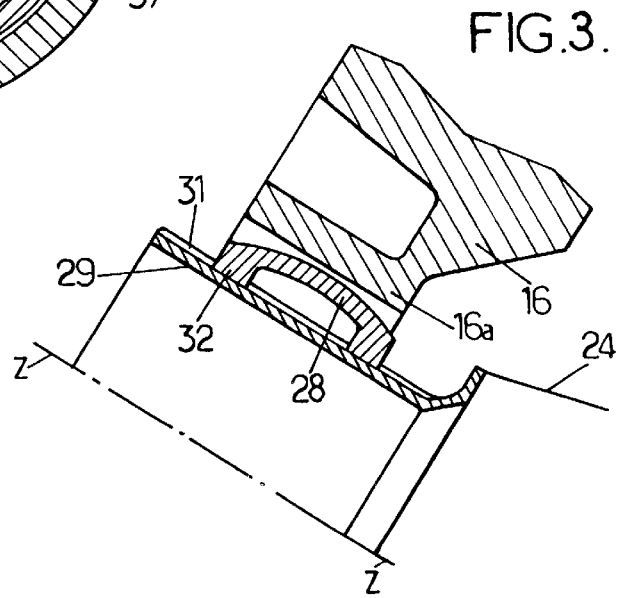
FIG. 3 is a partial sectional view in accordance with III—III of FIG. 2.

Rotational lock of the non-rotating plate 16 on the ball joint 28 is provided by means enabling simultaneously oscillations of the non-rotating plate 16 on this ball joint 28. These means include, on the ball joint 28, two cylindrical sectors 33, diametrically opposite in relation to the center of the ball joint 28 and concentric around a diametrical axis Y—Y of the ball joint 28, this axis Y—Y (perpendicular to the plane in FIG. 1) being non-rotating and perpendicular to the rotor axis Z—Z. As can be seen in FIG. 2, the two cylindrical sectors 33 have the same constant transverse section (along axis Y—Y) and are therefore symmetrical in relation to their median plane which is a radial plane passing through the axis Z—Z. The cylindrical sectors 33 are raised by milling in two diametrically opposite parts of the ball joint 28, and so that each sector 33 appears radially projecting, outwards, in relation to the axis Z—Z, on the flat bottom 34 of one of two hollows 35 respectively which are symmetrical with each other on either side of the axes Z—Z and Y—Y. and arranged by milling in the spherical volume enveloping the ball joint 28. The external radial face (in relation to the center of the ball joint 28) of each sector 33 thus delimits a guide track 36, which is a cylindrical surface part of axis Y—Y, or in a circular arc around the axis Y—Y, and between two plane lateral faces 37 of the sector 33. The sectors 33 thus constitute guide bars for two parts 38 guided in rotation around the axis Y—Y.

These parts 38 are the means mounted diametrically opposite (in relation to the center of the ball joint 28) on the non-rotating plate 16 to immobilize it from rotating around the ball joint 28. Each part 38 comprises a clevis 39, with a bottom 40 with a cylindrical surface, of corresponding radius to that of the track 36 and sliding on the track 36 of a sector 33, and between two clevis flanges 41, which are supported against the lateral faces 37 of said sector 33 to lock the part 38 against rotation around the axis Z—Z on this sector 33, when the clevis 39 overlaps this sector 33 of the ball joint 28. Each part 38 also includes a trunnion 42, which is cylindrical of circular section. Each part 38 is engaged by its clevis 39 on one of the sectors 33 respectively, so as to be able to slide on the corresponding track 36 on a circular arc trajectory around the axis Y—Y and practically without circumferential play around the axis Z—Z. Simultaneously, each part 38 has its trunnion 42 engaged pivoting, with the interposition of slip rings 43, in one of two bores respectively arranged in the central part 16a of the non-rotating plate 16, so as to emerge in the internal radial face of this central part 16a. These two cylindrical bores are diametrically opposite in relation to the center of the non-rotating plate 16, which center is situated at the intersection of the axes Z—Z and Y—Y, and these two bores are coaxial around a diametrical axis of the non-rotating plate 16, with the result that the non-rotating plate 16 can pivot on the trunnions 42 around this diametrical axis of the non-rotating plate 16 which is merged with another diametrical axis X—X of the ball joint 28, this other diametrical axis X—X being perpendicular to the diametrical axis Y—Y.

Thus, the two parts 38 are restrained in pivoting on the non-rotating plate 16 around this diametrical axis X—X of the ball joint 28, thanks to the trunnions 42 projecting radially outwards from the devises 39 (in relation to the diametrical axis Y—Y) and engaged in the bores of the non-rotating plate 16, and, simultaneously, the two parts 38 can slide by their devises 39 on the sectors 33, by following the circular arc trajectories which are diametrically opposite and concentric around the axis Y—Y, and thus tilt the non-rotating plate 16 around the diametrical axis Y—Y.

This oscillating mounting of the non-rotating plate 16 on the ball joint 28 is similar to a cardan since it enables two pivot movements of the non-rotating plate 16 in relation to the ball joint 28 around two axes X—X and Y—Y perpendicular to each other.

The control of the three actuators 23 enables the two plates 14 and 16 and the ball joint 28 to be translated along the axis Z—Z along the guide 29 and/or the plates 14 and 16 to be tilted on the ball joint 28 in any direction around the axis Z—Z, in order to transmit variations in collective pitch and cyclic pitch respectively to the blades 3 by means of the rods 19.

Indeed, collective pitch is provided by the sliding of the central ball joint 28 on the guide 29 by the engagement of the splines 31 and 32. Cyclic pitch is provided by the tilting of the non-rotating plate 16 in any direction around the axis Z—Z by means of the two combined pivoting movements described above around the axes X—X and Y—Y. The rotational drive stress endured by the non-rotating plate 16 being small, since created solely by the rolling resistance of the balls or other bearing parts in the two bearings 15, the sizing of the sectors 33 and of the parts 38 is easy to achieve in the available space on the ball joint 28 and in the non-rotating plate 16.

The assembly of the parts 38 by their clevis 39 on the sectors 33 is ensured by tilting the central ball joint 28 by 90° around the axis Y—Y, after inserting the trunnions 42 into the bores of the non-rotating plate 16, and when the swash-plate assembly 13 is on an assembly table, before its installation around the rotor shaft 2.

The use of the splines 31 and 32 on the ball joint 28 and the guide 29, and of the sectors 33 on the ball joint 28 and of the parts 38 rotary mounted in the non-rotating plate 16 and sliding on the sectors 33, in place of a non-rotating torque link, in order to restrain the non-rotating plate 16 from rotating, enables the axial space requirement to be reduced since these means do not extend axially over a distance greater than the axial space requirement of parts not replaced, such as the guide 29, the ball joint 28 and the non-rotating plate 16, in particular its central part 16a.

But there remains at least one rotating torque link 25 to drive the rotation of the rotating plate 14.

Figure 4:
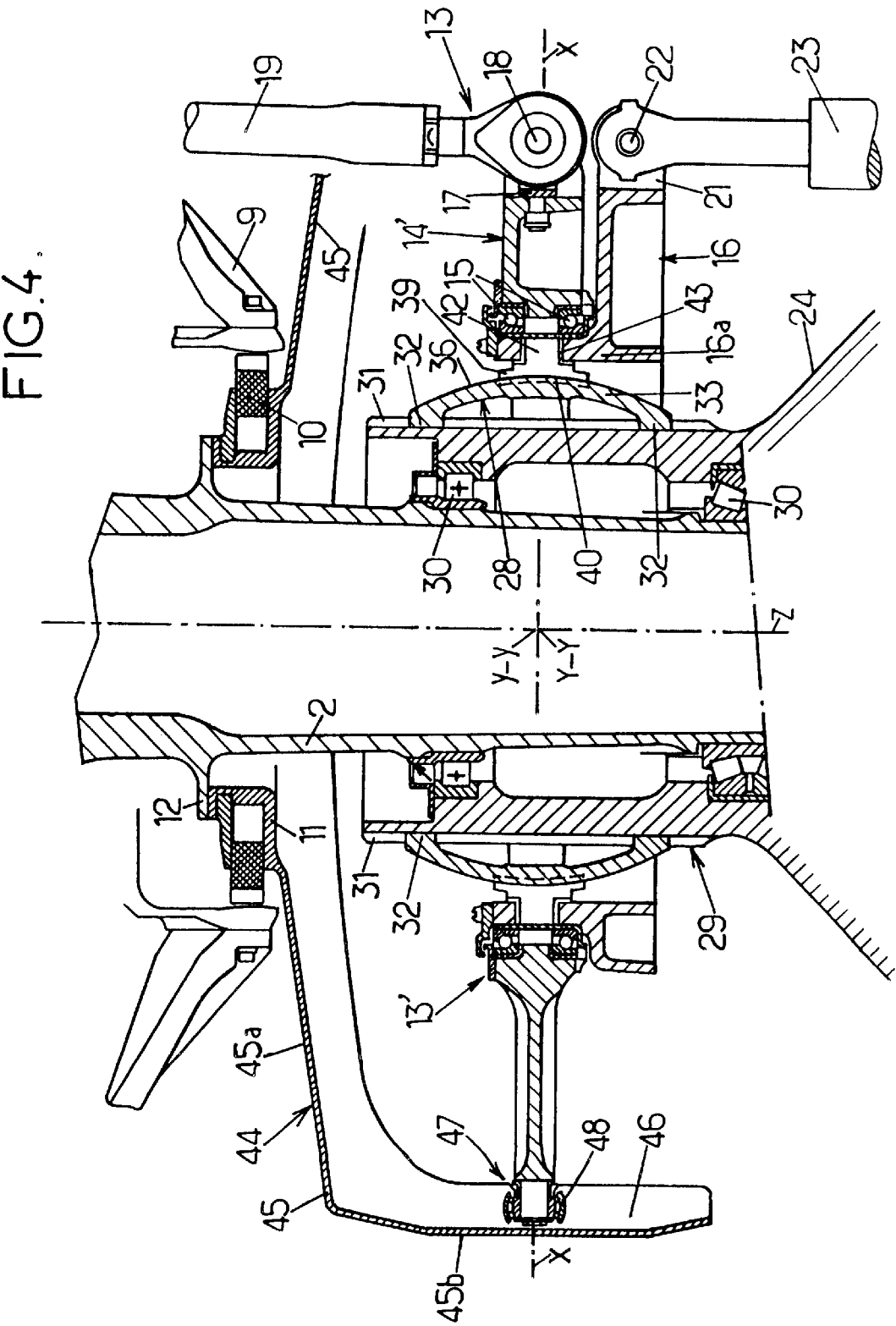
FIG. 4 is a partial view, similar to FIG. 1, of a rotor equipped with a second example of a pitch control arrangement in accordance with the invention.
Figure 5:
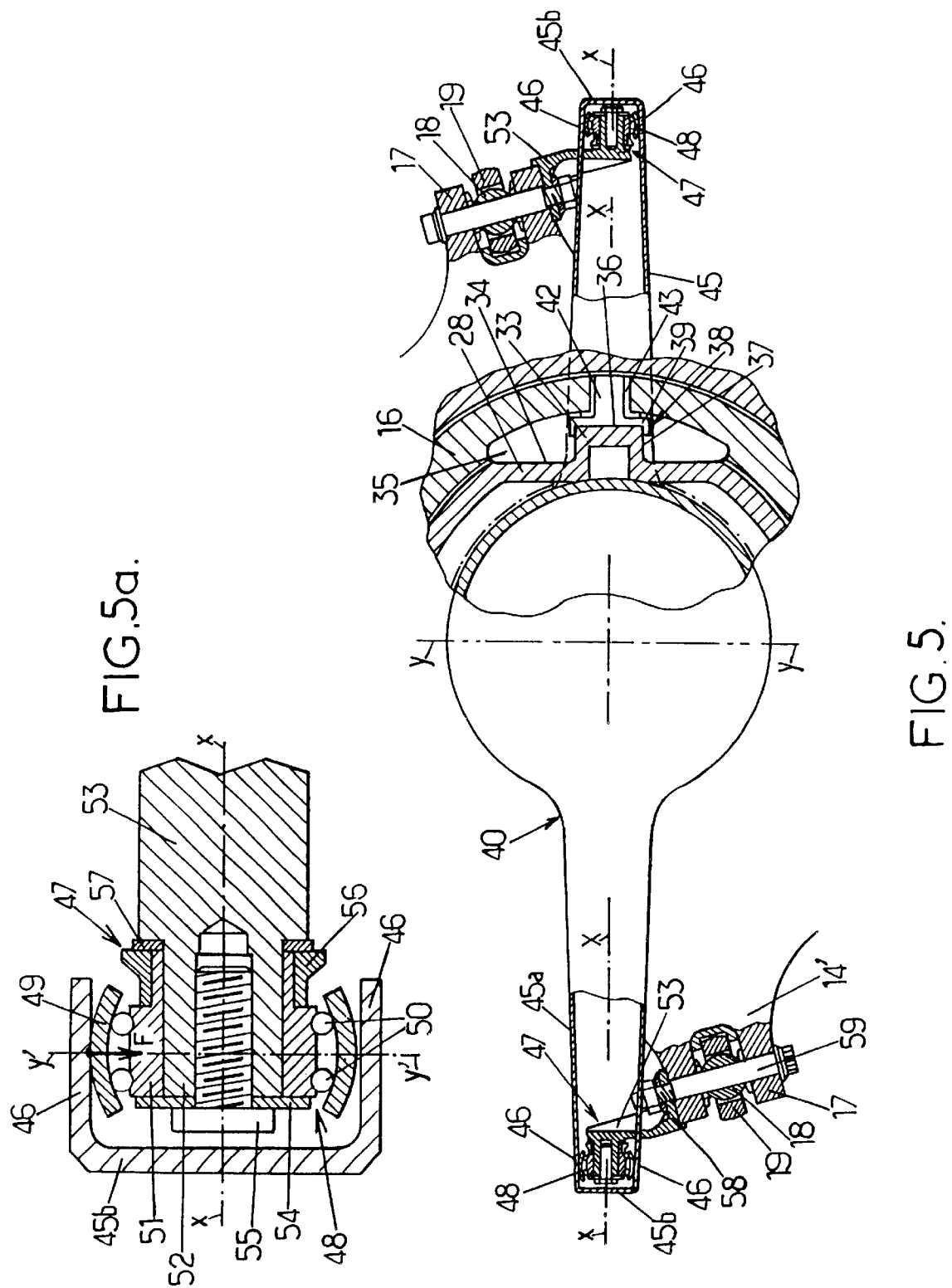
FIG. 5 is a transverse sectional partial view of the pitch control device in FIG. 4.

In order further to reduce the axial space requirement of the device, it is possible, as shown in FIGS. 4 and 5, to replace the torque link or links such as 25 by a rotating plate driver such as that described in the French patent application FR 97 12126, and the effects of which combine to advantage with those of the means characteristic of the invention and described above, to restrain the non-rotating plate 16 from rotating around the rotor axis Z—Z.

The rotor and the pitch control device partially shown in FIG. 4 have a general structure similar to that of the rotor and of the device in FIG. 1, with the result that similar elements are indexed by the same reference numbers in FIGS. 1 and 4, and the description below is limited to the particularities of the example in FIG. 4, which concern solely the means for driving the rotation of the rotating plate 14' of the swash-plate assembly 13', the non-rotating plate 16 of which is, as in the previous example, rotating on the trunnions 42 of guided parts 38 sliding by their clevis 39 on cylindrical sectors 33 of the ball joint 28 engaged by internal splines 32 with the external splines 31 of the guide 29.

It will be recalled that, in accordance with FR 97 12126 to which reference will be made for more details, and the content of which is incorporated in the present application by way of reference, driving the rotating plate 14' to rotate with the rotor is ensured by a driver 44. In FIGS. 4 and 5, the driver 44 includes two rigid arms 45, diametrically opposite in relation to the rotor axis Z—Z and fixed under the flange ring 12 of the rotor shaft 2 by a driver central part constituting, in this example, the lower annular part of the support ring 11 of the droop restraining ring 10. The driver 44 is thus rotating integrally with the shaft 2, above the swash-plate assembly 13'. Each arm 45 includes a part 45a substantially radial in relation to the axis Z—Z and prolonged by an axial part 45b parallel to the axis Z—Z over the major part of its axial length, and slightly curved towards the axis Z—Z at its lower end and at its upper end connecting to the radial part 45a. The axial arm part 45b has a "U" shaped transverse section delimiting a groove open radially towards the rotor axis Z—Z. The internal faces of the two flanges 46 of the "U" shaped groove in each axial arm part 45b thus form a rigid rotational drive track of one of two drive pins 47 respectively integral with the rotating plate 14' and diametrically opposite on the latter (see FIG. 4), each pin 47 projecting radially outwards from the rotating plate 14' and engaged between the two flanges 46 of the "U" shaped groove of one of the axial arm parts 45b respectively.

In this example, each pin 47 includes one of two coaxial rollers 48 respectively each rolling in one of the "U" shaped grooves respectively, against one at least of the flanges 46 of the "U" shaped groove delimiting the corresponding drive track, and around the common axis of the rollers 48, which is a diametrical axis of the rotating plate 14' and located as x—x in FIGS. 4 and 5 [it should be noted that, in the particular position of the rotating plate 14' in FIGS. 4 and 5, the axes x—x and X—X are merged, but the axis x—x is a rotating axis, whereas the axis X—X is a non-rotating axis around the rotor axis Z—Z].

In operation, the trajectory and behavior of the rollers 48 are as follows: for cyclic pitch, the two rollers 48 roll in the "U" shaped grooves of the axial arm parts 45b of the driver 44 following an alternate circular trajectory portion (sinusoidal motion) around a second diametrical axis y—y (perpendicular to x—x) of the rotating plate 14'. [Just as for axes X—X and x—x, Y—Y and y—y are merged in FIGS. 4 and 5, but y—y is a rotating axis whereas Y—Y is non-rotating around Z—Z]. In the case of variation in collective pitch, the two rollers 48 roll in the "U" shaped grooves between the flanges 46 following a rectilinear trajectory, parallel to the rotor axis Z—Z, upwards (towards the hub 1) or downwards (towards the structure and the conical housing 24) in accordance with the collective pitch required. In the case of combined cyclic pitch and collective pitch, both rollers 48 are compelled to pivot around an axis y'—y' (see FIG. 5a), which is parallel to the axis y—y and passes through the center of the roller 48. This pivot angle is maximum at the upper and lower ends of the trajectory of the rollers 48 between respectively the maximum collective pitch and the maximum positive cyclic pitch, on the one hand, and, on the other hand, the minimum collective pitch and the maximum negative cyclic pitch.

In order to eliminate all risk of sliding during collective pitch change (trajectory parallel to the rotor axis Z—Z), each roller 48 is preferably a ball joint roller, as shown on a larger scale in FIG. 5a.

FIG. 5a shows the structure and assembly of a ball joint roller, the proposed sole use of which is to drive the rotation around the axis Z—Z of a pin 47 by the same flange 46 of the "U" shaped groove in which the pin 47 is engaged, the contact stress F being therefore always on the same flange 46. The roller 48 in FIGS. 4, 5 and 5a includes a ball joint 49, centered on the intersection of the axes x—x and y'—y' mentioned above, and mounted rotary around the diametrical axis x—x of the rotating plate 14' and pivoting around the axis y'—y' by two ball bearings 50 offset along the axis x—x on an annular hub 51 supporting the roller 48 on the external radial and cylindrical end 52 of a pin-support arm 53 integral with the rotating plate 14'. The hub 51 is restrained on the arm 53 by the support of its axial end turned towards the arm 53, and of reduced external diameter, against a shoulder connecting the end part 52 to the arm 53, and by the support of a washer 54 against the other axial end of the hub 51, the washer 54 being kept in place by the head of a screw 55 with the shank screwed into the end part 52 of the pin support arm 53. Moreover, in order to limit the pivot angle of the ball joint 49 around the axis y'—y' and reduce friction, a ring 56 is rotary mounted around the diametrical axis x—x on the axial end of reduced external diameter of the annular hub 51. The maximum pivot angle of the ball joint 49 is limited on the rotating ring 56 coaxial to the roller 48, by a truncated contact face with the top situated at the intersection of the axes x—x and y'—y'. An anti-friction ring 57 is preferably interposed between the shoulder on the pin support 53, on one side, and on the other side, the rotating ring 56 and the hub 51.

During variations in blades 3 and sleeves 5 pitch, in order to avoid any interference between the pitch rods 19 and the driver 44, and in particular between each of the two arms 45 and the pitch rod 19 which is the nearest, circumferentially, to each of these two arms 45, the pin support arm 53, which could be a radial arm of a single piece with the rotating plate 14', is preferably an angled arm, as shown in FIG. 5, and added to project laterally over a side of the clevis 17 of the rotating plate 14' in which the closest pitch rod 19 to the driver arm 45 being considered is articulated.

To this end, the angled pin support arm 53 has a tab 58 fixed against the external side face of one of the two branches of the clevis 17 by the screw-nut assembly 59 forming simultaneously a restrainer axis of the ball joint 18 of the lower end of the pitch rod 19 in this clevis 17 of the rotating plate 14'.

Figures 6, 8:
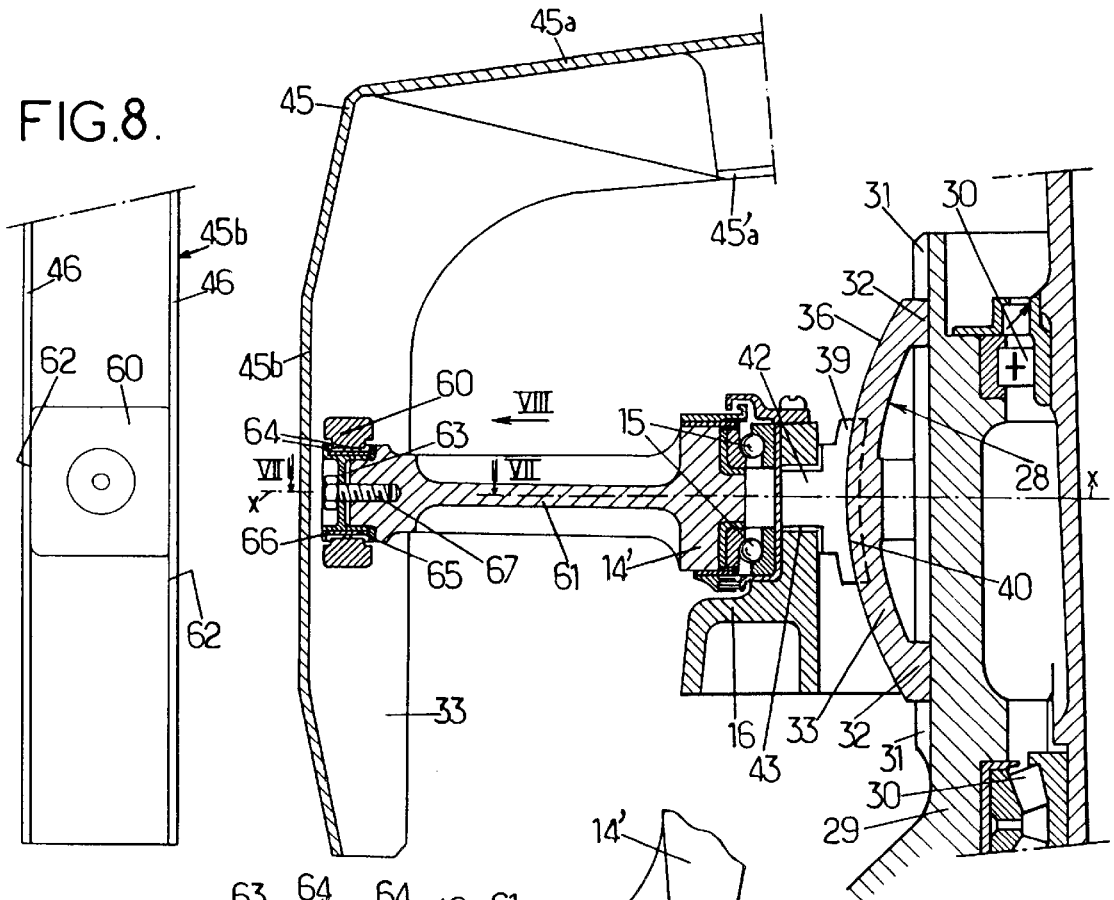
FIG. 6 is a partial axial semi-sectional view of a variant of the device in FIG. 4.
Figure 7:
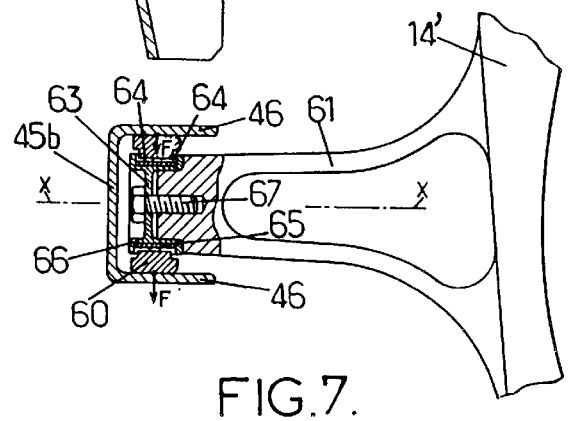
FIG. 7 is a partial sectional view in accordance with VII—VII of FIG. 6, and, FIG. 8 is a partial view, in accordance with the arrow VIII of FIG. 6.

FIGS. 6 to 8 show a variant of the driver device 44 in FIGS. 4 and 5 with a second drive pin example, usable in place of the pin 47 with roller 48 in FIGS. 4 to 5a in case of pin rotational drive being carried out with a contact stress F applying alternately to one or other of the two flanges 46 (see FIG. 7) of the "U" shaped groove.

In this variant, each pin includes one of two pads 60 respectively sliding alternately against one or other of the two flanges 46 of the axial part 45b of the corresponding rigid arm 45 of the driver 44, identical to that of the previous example. To facilitate load transfer between the flanges 46 and the pad 60, by reducing friction, the internal face of the flanges 46 may have a carbide coating on its zone corresponding to the trajectory of the pad 60, the external zones of the faces of which, coming into contact with the flanges 46, can also have carbide coatings. Each pad 60 has the general external shape of a relatively flat right angled parallelepiped, punched with a central cylindrical aperture of circular section.

Through this aperture, each pad 60 can be articulated in relation to the rotating plate 14', to which the pad 60 is connected by a pin support arm 57 radial in relation to the center of the rotating plate 14' and of a single piece with the latter, made for example of aluminum, whereas the driver 44 and its arms 45 are made for example of steel. Each pad 60 thus has two opposite side faces 62 which are plane and parallel to each other and to the flanges 46 of the "U" shaped groove in which the pad 60 slides, and through its central aperture each pad 60 is mounted rotary and sliding around a hub 63 supporting the pad 60 on the external radial end of the pin support arm 61. To this end, anti-friction shoulder rings 64 are mounted in the central aperture of the pad 60, and around an anti-friction ring 65 housed in the bottom of a "U" shaped groove delimited by an annular rim 66 on the periphery of the hub 63, which is centered by its rim 66 around the cylindrical external radial end of the pin support arm 61 and kept against this end by the head of a screw 67 with the shank traversing the central part of the hub 63 and screwed into this arm end 61.

In this variant, the substantially radial part 45a of each driver 45 arm can have a "U" shaped structure open downwards, i.e. towards the swash-plate assembly 13', as in the example in FIGS. 4 and 5 or again, as can be seen in FIG. 6, a box-type structure shown as 45'a, so as to offer greater rigidity.

The blade pitch control devices of the invention as described above, enable main rotor mast-hub assemblies to be made which have a smaller vertical or axial space requirement compared with known embodiments with non-rotating torque links for the restraint of the non-rotating plate and rotating torque links for driving the rotating plate of the swash-plate assembly.

In addition, the means for rotational lock of the non-rotating plate and possibly means for driving the rotating plate as described above include fewer parts and are less heavy and less expensive to manufacture, assemble and maintain than versions with non-rotating and rotating torque links.

In particular, the branches of at least the non-rotating torque links are eliminated, as are their articulations including carbide pins and rings, which are heavy and expensive.

What is claimed is:

1. A device for controlling a pitch of a plurality of blades of an aircraft rotor on which each blade is, firstly, rotated around an axis of rotation of a shaft of the rotor by means of a hub rotating integrally with the shaft, and, secondly, rotating integrally, around a longitudinal blade pitch change axis, with at least one pitch lever controlled by a corresponding pitch rod, connected to a plate rotating with the rotor and belonging to a swash-plate assembly in which the rotating plate is rotary mounted on a non-rotating plate, restrained against any rotation around the rotor axis, the two plates being annular, surrounding the rotor axis, and being oscillating mounted by the non-rotating plate on a central ball joint, centered on the rotor axis and mounted sliding parallel to the rotor axis around a cylindrical guide coaxial to the rotor axis and non-rotating around said rotor axis, so that the swash-plates can be translated parallel to the rotor axis and tilted in any direction around the rotor axis, being activated by control actuators connection the non-rotating plate to a structure of the rotor aircraft, for the control of a collective pitch and a cyclic pitch respectively of the blades, wherein the ball joint is immobilized in rotation around said rotor axis, on said guide, and the non-rotating plate is mounted pivoting, around a first diametrical axis of the ball joint, on two parts diametrically opposite in relation to the center of the ball joint and simultaneously locked against rotation, around the rotor axis, on the ball joint and guided pivoting around a second diametrical axis of the ball joint, which second axis is perpendicular to said first diametrical axis and to the rotor axis, by guide means on the ball joint, said guide means guiding each of said parts on one of two trajectories respectively in circular arcs diametrically opposite in relation to the center of the ball joint and concentric around said second diametrical axis, wherein each guided part includes a trunnion, engaged to pivot in one of two bores respectively of the non-rotating plate, which the bores emerge in an internal radial face of said non-rotating plate, and are diametrically opposite in relation to the center of the non-rotating plate and coaxial around a diametrical axis of said non-rotating plate which the diametrical axis is merged with said first diametrical axis of the ball joint, so as to enable the non-rotating plate to pivot on the trunnions of the guided parts.

2. A device according to claim 1, wherein the ball joint is immobilized in rotation on the guide by internal splines of the ball joint, which internal splines extend parallel to the rotor axis and engage with external axial splines of said guide, fixed to the structure of the aircraft.

3. A device according to claim 1, wherein said guide means include two raised sectors, diametrically opposite in relation to the center of the ball joint, and each projecting radially outwards, in relation to the rotor axis, on the bottom of one of two hollows respectively arranged in the ball joint on either side of the rotor axis and of said second diametrical axis of the ball joint, so that each of the two sectors delimits on its external face a circular arc guide track around said second diametrical axis.

4. A device according to claim 3, wherein the two sectors are cylindrical sectors with a same constant transverse dimension and the axis of which is merged with said second diametrical axis.

5. A device according to claim 3, wherein each guided part includes a clevis overlapping one of the sectors respectively, and sliding by a clevis bottom against the guide track on the external face of said sector, whereas one at least of two flanges of the clevis provides the restraint for said clevis against rotating around the rotor axis, on said sector by contact with one at least of side faces of said sector.

6. A device according to claim 1, wherein the rotating plate is rotated with the rotor with the help of at least one rotating torque link, including at least two branches articulated one on the other and one on the rotating plate, whereas the other branch is articulated on the rotor shaft-hub assembly.

7. A device according to claim 1, wherein the rotating plate is rotated with the rotor with the help of a drive including two rotational drive rigid tracks, extending at least partly substantially axially, parallel to the rotor axis, diametrically opposite in relation to said rotor axis and rotating integrally with one at least of two parts that are the hub and the shaft of the rotor, each track engaging with one of two drive pins respectively, rotating integrally with the rotating plate and diametrically opposite on the rotating plate, one of two engaging elements namely a track and a pin having two flanges between which another of the two engaging elements is engaged, so that each drive pin follows on the corresponding track a rectilinear trajectory, parallel to the rotor axis, in the case of a variation of the collective pitch, and a circular arc trajectory centered on the rotor axis, in the case of variation in the cyclic pitch.

8. A device according to claim 7, wherein each drive track is delimited in a substantially axial groove of the driver, and the corresponding pin is engaged in the groove.

9. A device according to claim 8, wherein each groove is formed in a substantially axial part having a "U" shaped transverse section of one of two rigid drive arms respectively, and the corresponding pin is engaged between the two flanges of the "U" shaped groove of said arm.

10. A device according to claim 9, wherein said "U" shaped groove is open radially towards the rotor axis, and each pin projects outwards from the rotating plate, radially in relation to the center of said rotating plate.

11. A device according to claim 9, wherein one at least of the pins includes at least one pad sliding against one at least of the two flanges of the "U" shaped groove delimiting the corresponding drive track.

12. A device according to claim 11, wherein the pins each comprise one of two coaxial rollers respectively, mounted diametrically opposite on the rotating plate and rolling around their common axis.

13. A device according to claim 11, wherein said pad is articulated in relation to the rotating plate.

14. A device according to claim 13, wherein said pad has two opposite side faces approximately plane and parallel to the flanges of the "U" shaped groove in which the pad slides, and the pad is mounted rotary and sliding around a pad support hub which is fixed to the external radial end of a pin support arm of the rotating plate.

15. A device according to claim 9, wherein one at least of the pins includes at least one roller rolling against one at least of the two flanges of the "U" shaped groove delimiting the corresponding drive track.

* * * * *